(12) United States Patent
Narinder et al.

(10) Patent No.: US 10,342,187 B2
(45) Date of Patent: Jul. 9, 2019

(54) ON AND OFF TUBE WEIGHT FOR DRIP IRRIGATION

(71) Applicant: Jain Irrigation Systems Limited, Bambhori, Jalgaon, Maharashtra (IN)

(72) Inventors: Gupta Narinder, Davenport, FL (US); Patil Narendra, Bambhori (IN); Wayne Burt Douglas, West Richland, WA (US); B. Jain Ajit, Bambhori (IN)

(73) Assignee: Jain Irrigation Systems Limited (IN)

( * ) Notice: Subject to any disclaimer, the term of this patent is extended or adjusted under 35 U.S.C. 154(b) by 0 days.

(21) Appl. No.: 14/411,197

(22) PCT Filed: Jun. 28, 2013

(86) PCT No.: PCT/IN2013/000402
§ 371 (c)(1),
(2) Date: Dec. 24, 2014

(87) PCT Pub. No.: WO2014/002119
PCT Pub. Date: Jan. 3, 2014

(65) Prior Publication Data
US 2015/0313100 A1    Nov. 5, 2015

(30) Foreign Application Priority Data
Jun. 28, 2012    (IN) .......................... 1872/MUM/2012

(51) Int. Cl.
*A01G 27/00*    (2006.01)
*A01G 25/02*    (2006.01)

(52) U.S. Cl.
CPC ......... *A01G 27/008* (2013.01); *A01G 25/023* (2013.01); *A01G 27/005* (2013.01)

(58) Field of Classification Search
CPC .. A01G 25/023; A01G 27/005; A01G 27/008; A01G 9/247; A01G 25/02; A01G 2025/006; F16K 31/445; B05B 1/3026
USPC ................. 251/149.1, 347; 239/542, 533.15, 239/456–457; 47/79
See application file for complete search history.

(56) References Cited

U.S. PATENT DOCUMENTS

| | | | | |
|---|---|---|---|---|
| 688,314 A | * | 12/1901 | Kemp | F23D 14/48 251/266 |
| 917,071 A | * | 4/1909 | Huestis | F16L 29/00 137/231 |
| 1,451,025 A | * | 4/1923 | Kraft | F16K 1/38 251/347 |
| 2,741,496 A | * | 4/1956 | Melsom | F16L 33/01 285/222.4 |

(Continued)

*Primary Examiner* — Reinaldo Sanchez-Medina
*Assistant Examiner* — David Colon-Morales
(74) *Attorney, Agent, or Firm* — McCarter & English, LLP; David R. Burns

(57) ABSTRACT

The present invention proposes a device for controlling discharge by a conduit. The device comprises a body, a mouth or a first portion attached to the body and a needle or a second portion attached to the body. The mouth and the needle are coaxial. The mouth receives an end portion of the conduit, such that when Areceived, an internal surface of the mouth is in contact with an external portion of the end portion of the conduit. The needle is arranged to be inserted into the received end portion of the conduit, such that an external surface of the needle is in contact with an internal surface of the end portion of the conduit.

4 Claims, 7 Drawing Sheets

(56) References Cited

U.S. PATENT DOCUMENTS

| | | | | |
|---|---|---|---|---|
| 2,998,028 A * | 8/1961 | Rohde | ............... | F16L 11/121 |
| | | | | 138/109 |
| 3,199,791 A * | 8/1965 | Chapin | ............... | A01G 27/008 |
| | | | | 239/450 |
| 3,482,785 A * | 12/1969 | Chapin | ............... | A01G 27/008 |
| | | | | 239/542 |
| 3,484,516 A * | 12/1969 | Simons | ............... | A01J 5/08 |
| | | | | 264/254 |
| 3,804,334 A * | 4/1974 | Curry | ............... | A01G 25/023 |
| | | | | 239/276 |
| 3,825,030 A * | 7/1974 | Kalsi | ............... | F16K 27/065 |
| | | | | 137/375 |
| 3,840,209 A * | 10/1974 | James | ............... | F16L 55/02772 |
| | | | | 138/43 |
| 3,971,541 A * | 7/1976 | Griffin | ............... | F16K 31/445 |
| | | | | 251/320 |
| 4,031,915 A * | 6/1977 | McElhoe | ............... | A01G 25/06 |
| | | | | 137/529 |
| RE29,546 E * | 2/1978 | Blass | ............... | A01G 25/023 |
| | | | | 239/542 |
| 4,722,481 A * | 2/1988 | Lemkin | ............... | A01G 25/023 |
| | | | | 137/513.5 |
| 4,772,496 A * | 9/1988 | Maeda | ............... | H05K 1/0326 |
| | | | | 156/245 |
| 5,004,161 A * | 4/1991 | Antel | ............... | A01G 25/023 |
| | | | | 239/542 |
| 5,267,695 A * | 12/1993 | Thayer | ............... | B05B 15/066 |
| | | | | 239/548 |
| 5,553,786 A * | 9/1996 | Israel | ............... | A01G 25/023 |
| | | | | 239/456 |
| 5,769,318 A * | 6/1998 | Greubel | ............... | B05B 7/2462 |
| | | | | 239/10 |
| 5,837,086 A * | 11/1998 | Leeb | ............... | B29C 45/1418 |
| | | | | 156/245 |
| 6,695,231 B2 * | 2/2004 | Dramm | ............... | A01G 27/005 |
| | | | | 239/510 |
| 6,768,654 B2 * | 7/2004 | Arnold | ............... | B29C 45/14811 |
| | | | | 174/394 |
| 6,901,698 B2 * | 6/2005 | Manning | ............... | A01G 25/02 |
| | | | | 138/139 |
| 6,913,244 B1 * | 7/2005 | Atkinson | ............... | F16K 1/123 |
| | | | | 251/343 |
| 2006/0003172 A1 * | 1/2006 | Scherer | ............... | B29C 45/162 |
| | | | | 428/457 |
| 2006/0121251 A1 * | 6/2006 | Oberacher | ............... | B29C 45/1418 |
| | | | | 428/172 |
| 2008/0079258 A1 * | 4/2008 | Siegel | ............... | F16L 21/002 |
| | | | | 285/5 |
| 2009/0151798 A1 * | 6/2009 | Harned | ............... | A01G 25/14 |
| | | | | 137/513.3 |
| 2011/0274867 A1 * | 11/2011 | Pohlmann | ............... | B29C 45/1671 |
| | | | | 428/67 |

* cited by examiner

ON AND OFF TUBE WEIGHT FOR DRIP IRRIGATION

CROSS-REFERENCE TO RELATED PATENT APPLICATIONS

This application is a 35 U.S.C. § 371 National Stage filing of International Application No. PCT/IN2013/000402, filed on Jun. 28, 2013, which claims the benefit of Indian Patent Application No. 1872/MUM/2012, filed on Jun. 28, 2012. The contents of each of the foregoing applications are incorporated herein by reference in their entireties.

FIELD OF INVENTION

The present invention relates to the ON/OFF tube weights used in drip irrigation systems in general, and to drip system used in, basket plant irrigation such as nursery plantation or so in particular.

BACKGROUND

ON/OFF tube weights are being in use since years along with the drip irrigation tubes to irrigate plants grown in basket or at the initial nursery stage. The plants need to be provided with required amount of water and fertilizers at regular interval for healthy growth. In plant nursery, the plants are kept for some pre-estimated period under controlled conditions and then these plants are shifted to the field or other place. In order to irrigate these plants at nursery stage, modern nursery uses drip irrigation system to irrigate these plants. Depending on the growth and maturity achieved, these plants are shifted out periodically. Thus it is not necessary that all the plants at the nursery shed are shifted out at once. As plants are shifted out depending on their level of maturity, the pre-installed drip system cannot be shut off pursuant to shifting the mature plants, as this may result in unhealthy growth of remaining plants. So there is a need for a system, which allows shutting off the water and nutrient supply of individual plant without affecting the other plants. This is achieved by the use of ON/OFF tube weights.

One such ON/OFF tube weight presently known, is made of lead material. The complete component is an assembly of three components along with an additional operation of flaring. The tube is inserted and flared inside the assembly to get some pulling strength. Below this flared tube one conical needle arrangement is placed. In order to stop the water and fertilizer discharge, one needs to push fit the tube over the conical needle. This assembly stops the discharge. However, this system has certain drawbacks such as the complete assembly is a factory fitted assembly, thus failure of one component results in replacement of the complete assembly. Change in discharge of the tube weight, by changing the tube only is not possible, because the shut off is based on push fit principle without backing. Further, for elastic material, the tube weight results in partial shut off over a period of time. Apart from above drawbacks, the body is made of lead material, which is not environmental friendly.

Another tube weight presently known is made of plastic and metal part. This ON/OFF tube weight is provided with a female slot on its surface. To close the discharge, the tube needs to be bent by 180 degrees and inserted into this female slot. The drawbacks of this system are that the tube needs to be bent by 180 degrees. Frequent bending of the tube results in reduced tube life and also the tube needs to be bent sharp at 180 degrees. Slight negligence in it may result in partial shut off

OBJECTS OF INVENTION

The main objective of the present invention is to provide a novel, simple and economic ON/OFF tube weights used in drip irrigation systems, in particular the drip system used in basket plant irrigation.

Another objective of the present invention is to provide with a single piece moulded ON/OFF tube weight component.

Another objective of the present invention is to provide ON/OFF tube weights with no damage to discharge tubes.

Another objective of the present invention is to provide an ON/OFF tube weight compatible which is compatible with different tubes with different diameters Yet another objective of the present invention is to provide individual shut off to plants with the help of tube weights Yet another objective of the present invention is to provide flow regulation to individual plants with the help of tube weights Yet another objective of the present invention is to provide irrigation and other requirements to individual plants in a fluid medium depending upon the maturity of plants Further objective of the present invention is to provide adequate irrigation and other requirements to individual plants which are at varying elevations from the ground Further objective of the present invention is to provide environment friendly ON/OFF tube weights It is therefore a general object of the present invention to provide an improved. ON/OFF tube weight/s.

SUMMARY OF THE INVENTION

The present invention provides a single piece moulded component with thread serration at the mouth and overcome all the above drawbacks. The basic requirements such as it must have some weight to keep the water tube straight, it must have some provision to shut off the tube discharge, it must be compatible with different internal diameter tubes, it must be easily operatable, there must be minimum chance of damage, it must be replaceable and last but not least, it must be environment friendly are fulfilled by the present invention.

DETAILED DESCRIPTION OF THE INVENTION

Figure 1:
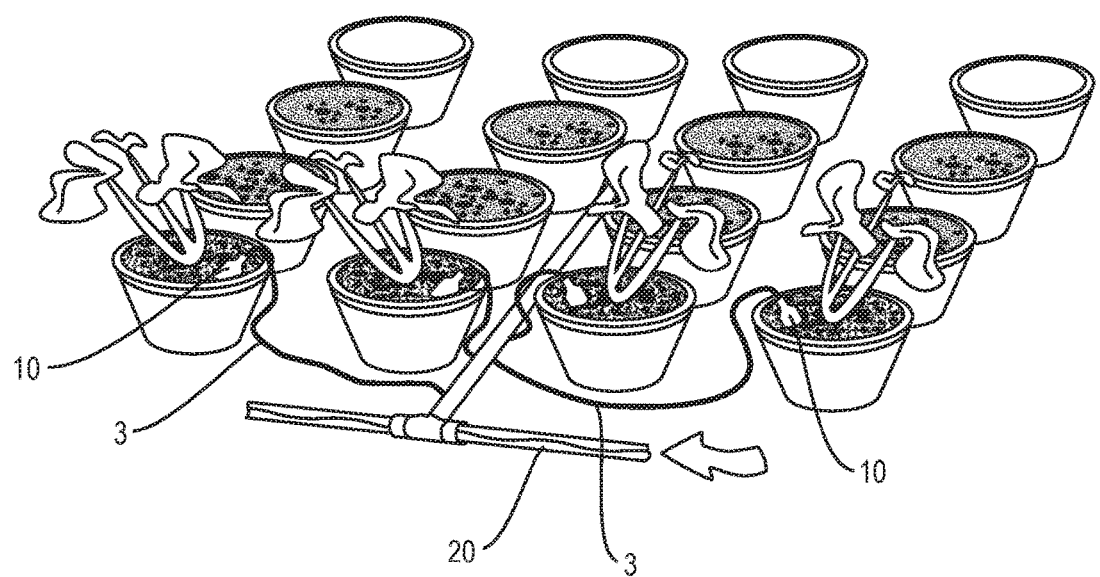
FIG. 1 shows an ON/OFF tube weight layout

FIG. 1 shows an ON/OFF tube weight layout. FIG. 1 discloses a device 10 for controlling discharge by a conduit 3. The device 10 is also referred to as the ON/OFF tube weight. The conduit 3 can be any one of a tube, pipe and a channel for conveying a fluid. The conduit can be used for irrigation of plants. The conduit can also be used for any purpose that involves conveying liquids from one place to another. In the case of FIG. 1, a set of conduits 3 is used for drip irrigation of potted plants. The fluid that is conveyed by the conduit 3 can be one of water, nutrient fluid and fluid mixed with fertilizers. The fluid is not restricted to what is mentioned above, but can be anything that can suitably flow through the conduit 3. The device 10 is used for controlling discharge by the conduit 3, which is explained hereinafter.

As illustrated in FIG. 1, the set of conduits 3 are supplied with the fluid by a main discharge tube 20. In other words, the main discharge tube 20 carries the fluid to be distributed to the set of conduits 3.

Figure 2:
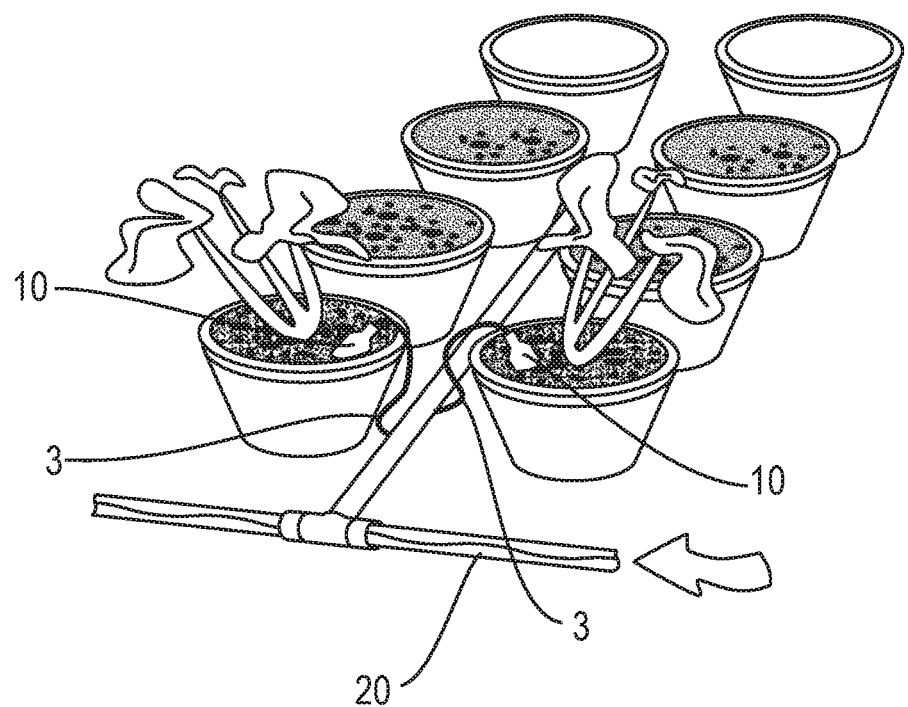
FIG. 2 shows a magnified view of the ON/OFF tube weight layout in FIG. 1
Figure 3:
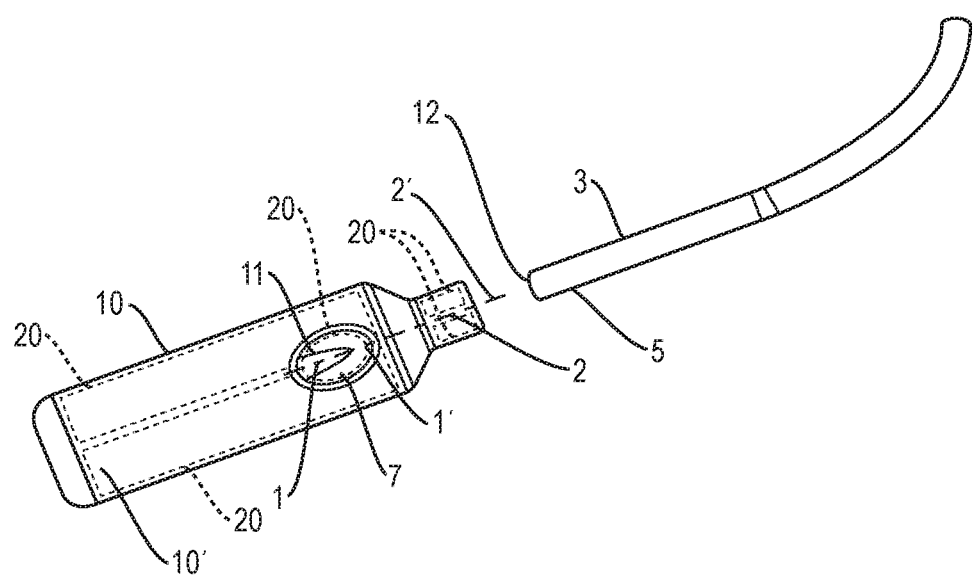
FIG. 3 shows the ON/OFF tube weight

FIG. 2 shows a magnified view of the ON/OFF tube weight layout in FIG. 1. The device 10 can also be used as a weight, which will be explained hereinafter. As illustrated in FIG. 3, the device 10 comprises a body 10'. The body 10' of the device 10 provides a surface for the user to grip the device 10 for usage of the device 10. The body 10' of the device 10 will be further explained hereinafter. The device 10 further comprises a first portion 2 attached to the body 10' of the device 10. The first portion 2 is attached to an end of the body 10' of the device 10. The first portion 2 can also be referred to as a mouth of the device 10 as it is arranged to be coupled to the conduit 3. The first portion 2 comprises a first axis 2'. As described earlier, the first portion 2 is arranged to be coupled to an end portion 5 of the conduit 3.

Figure 3A:
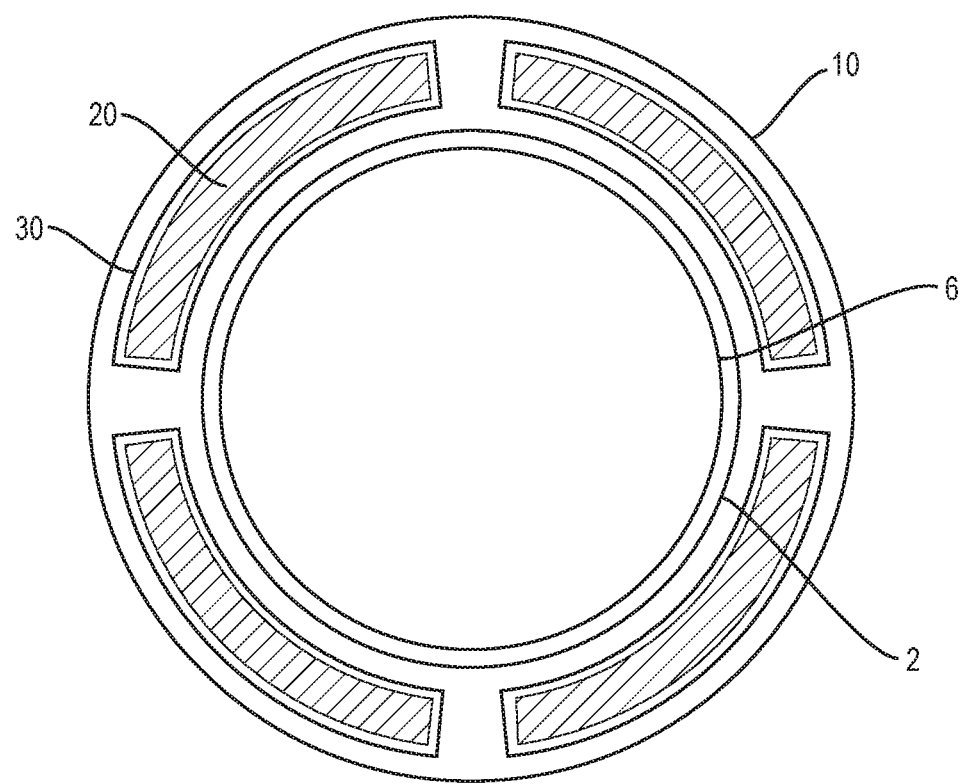
FIG. 3a shows the ON/OFF tube weight viewed from a mouth of the ON/OFF tube weight
Figure 4:
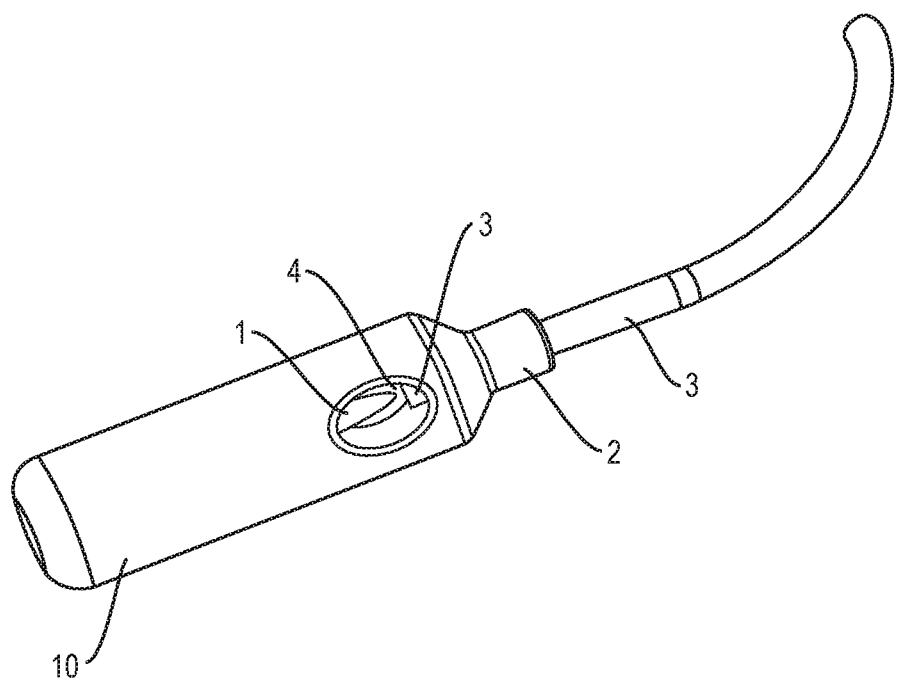
FIG. 4 shows the ON/OFF tube weight—'ON' position
Figure 5:
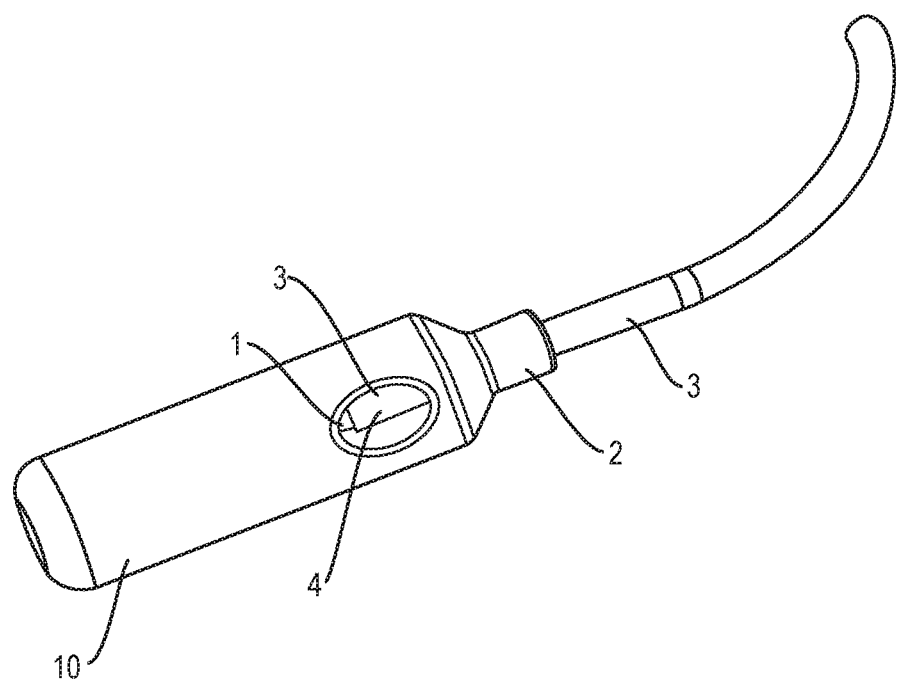
FIG. 5 shows the ON/OFF tube weight—'OFF' position
Figure 6:
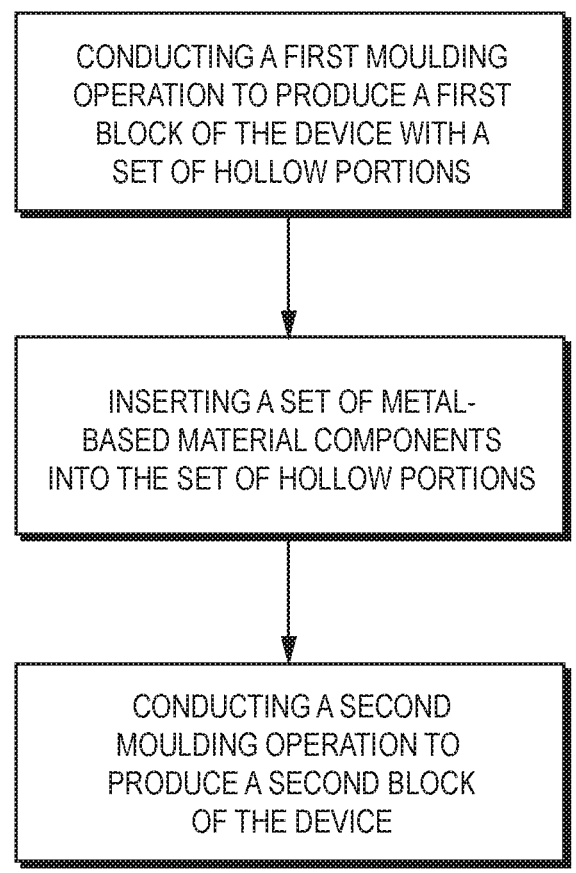
FIG. 6 shows the steps involved in a method of manufacturing a device for controlling discharge by a conduit

FIG. 3a shows the ON/OFF tube weight 10 viewed from the mouth of the ON/OFF tube weight 10. As illustrated in FIG. 3a, the first portion 2 comprises an internal surface 6 which opens out into a cavity 7 of the device 10.

As illustrated in FIG. 3, the coupling of the end portion 5 of the conduit 3 is achieved by receiving the end portion 5 of the conduit 3 in such a way that the internal surface 6 of the first portion 2 of the device 10 is in contact with an external surface 8 of the end portion 5 of the conduit 3. In other words, the end portion 5 of the conduit 3 is inserted into the first portion 2 or the mouth of the device 10, so that the internal surface 6 of the first portion 2 of the device 10 is in contact with the external surface 8 of the end portion 5 of the conduit 3.

The device 10 further comprises a second portion 1 disposed inside the cavity 7 of the device 10 and attached the body 10' of the device 10. The second portion 1 is also referred to as a needle. The second portion 1 comprises a second axis F. The first portion 2 and the second portion 1 are coaxial. In other words, the second axis 1' of the second portion 1 and the first axis 2' of the first portion 2 are collinear. In other words, the second axis 1' of the second portion 1 and the first axis 2' of the first portion 2 are in the same line. Further, the second portion 1 is positioned downstream along the direction of movement of the end portion 5 of the conduit 3 for coupling the first portion 2 to the end portion 5 of the conduit 3. In other words, the end portion 5 of the conduit 3 is moved along a direction for coupling the first portion 2 to the end portion 5 of the conduit 3 and the second portion 1 is located beyond the first portion 2 along the above described direction.

Further, the second portion 1 is arranged to be inserted into the end portion 5 of the conduit 3 when the first portion 2 and the end portion 5 of the conduit 3 are coupled. Coupling is referred to as the position when the end portion 5 of the conduit 3 passes through the first portion 2 and makes contact with the second portion 1. In other words, when the first portion 2 and the end portion 5 of the conduit 3 are coupled, the second portion 1 is inserted into the end portion 5 of the conduit 3. When the second portion 1 is inserted into the end portion 5 of the conduit 3, an external surface 11 of the second portion 1 is in contact with an internal surface 12 of the end portion 5 of the conduit 3. The end portion 5 of the conduit 3 is thus disposed between the internal surface 6 of the first portion 2 and the external surface 11 of the second portion 1. The insertion of the second portion 1 into the end portion 5 of the conduit 3 reduces the discharge area of the conduit 3, thereby controlling the amount of fluid discharged by the conduit 3. If the discharge area of the conduit 3 is fully closed by the second portion 1, then there will be no more discharge of fluid by the conduit 3. Moreover, the disposition of the end portion 5 of the conduit 3 between the first portion 2 and the second portion 1 provides for holding the end portion 5 by the first portion 2 and inserting the second portion 1 into the end portion 5 so as to control the discharge.

Further, the first portion 2 and the second portion 1 are not movable with respect to any point of reference in the body 10' of the device 10. In other words, the position of the first portion 2 and the second portion 1 are fixed with respect to any point of reference in the body 10' of the device 10.

Further, the first portion 2 is a cylinder. The first portion 2 can also be a polygon. The second portion 1, which is also referred to as the needle can be conical with a tip of the second portion 1 disposed towards the first portion 2. The internal surface 6 of the first portion 2 comprises a fastening arrangement to provide a frictional surface for holding the end portion 5 of the conduit 3. The fastening arrangement can be one of threads 6' and thread serrations. Once the end portion 5 of the conduit 3 is received by the first portion 2, the fastening arrangement enables the user to merely turn the device 10 for the end portion 5 of the conduit 3 to reach the coupling position. The user can hold the device 10 by the body 10' of the device 10.

The first portion 2, the second portion 1 and the body 10' are composed of polymer. The polymer can be polypropylene plastic or any similar polymeric material. The first portion 2, the second portion 1 and the body 10' of the device 10 is embedded with metal-based materials 20. The metal-based materials are embedded during the process of manufacturing the device 10, which is described hereinafter. The metal-based materials impart mass to the device 10, making the device 10 heavier than it would weigh if entirely composed of polymer. The weight of the device 10 enables the device to hold the conduit 3 to which it is attached in position. To elaborate this, if the conduit 3 has to supply fluid to a plant that is potted, the point of discharge of the fluid is higher than the level of ground. The conduit 3 may not be able to stay in position if there is nothing holding the conduit 3. The device 10 provides a holding force by virtue of the mass of the device 10 that holds the conduit 3 in position. This is also applicable when the point of discharge is the same as the level of ground or lower than the level of ground.

The metal-based material described above is one of a metal and an alloy. The alloy can be mild steel or any suitable alloy.

The device 10 is manufactured by a method involving injection moulding. The first step in the method of manufacturing the device 10 comprises conducting a first moulding operation using a first mould and polymer as the mould material to produce a first block of the device. The first block can be one half of the device 10. The first block comprises a set of hollow portions 30. The hollow portions are formed when the first block is moulded. The second step in the method of manufacturing the device 10 is inserting a set of metal-based material components into the set of hollow portions. To elaborate further, if there are four hollow portions in the first block, then one or more metal-based material components are inserted into each of the set of hollow portions. The set of hollow portions in the first block and the set of metal-based material components inserted may or may not be numerically equal. The third step in the method of manufacturing the device 10 comprises conducting a second moulding operation using a second mould and polymer as the mould material to produce a second block of the device. The second block is moulded over the first block so that the set of metal-based material components inserted into the set of hollow portions in the first block are covered by the second block. At the end of the second moulding operation, the device is manufactured with the metal-based material components embedded in the device.

The present invention relates to a product which is a single piece moulded component (10). The moulded component is manufactured by injection moulding process. The process requires two injection moulds and metal inserts. The steps are:
1) With first mould component is manufactured in Polypropylene Plastic (PP) material with hollow portion to place metal insert in it;
2) Final moulding is done to cover the metal insert with PP material in second mould.

Further metal insert is used to make ON-OFF tube weight heavier. Thus metal insert may be made of mild steel material and size and length of the same is maintained by automated turning process.

Pursuant to completion of the component in the second moulding step, it is assembled with the tube.

Thus the present invention relates to a product which is a single piece moulded component (10) with thread serration (2) at the mouth. These serrations (2) provide the strength to the tube (4) joint along the pulling force. Exactly opposite to this mouth (opening), is provided a conical needle arrangement (1). The needle (1) is purposely made conical to suit varying internal diameter of tubes (3) for different discharge requirements. To close the tube discharge, component (10) with conical needle (1) is turned into the tube. Turning off the component (10) with conical needle (1) inside the tube (3) makes a positive shut off because of inside and outside gripping (2). The conical needle (1) tries to expand the tube (3) whereas the threaded serrations (2) try to squeeze the tube (3), resulting in positive shut off (4). Apart from this the product (10) poses the following advantages such as:

No damage to the tube because elimination of folding/bending operation
Discharge can be changed by changing the tube (3) only
Tube (3) and the component (10) are independent of each other and any one can be replaced as and when required
It's a single piece moulded component (10)
It's made of lead free, recyclable material
It had the required minimum weight to keep the discharge tube straight
The tube weight (10) by itself acts as a flow controller
Individual plant flow shut off (4) is possible
The provision of internal gripping (2) provides better tube (2) gripping
The tube weight (10) can be used for plants at varying heights like hanging plants, table top plants, and ground level plants

We claim:
1. A device for controlling discharge by a conduit, comprising:
    a first portion made from a polymer embedded with a metal-based material attached to a body of the device, the first portion arranged to be coupled to an end portion of the conduit, wherein when coupled, an internal surface of the first portion is in contact with an external surface of the end portion of the conduit, and wherein the internal surface of the first portion opens out into a cavity of the device;
    a fastening arrangement disposed in the internal surface of the first portion; and
    a second portion made from a polymer embedded with a metal-based material, disposed inside the cavity of the device, and attached to the body of the device, the second portion and the first portion being coaxial, the second portion positioned downstream along a direction of movement of the end portion of the conduit for coupling the first portion to the end portion of the conduit, wherein the second portion is arranged to be inserted into the end portion of the conduit when the first portion and the end portion of the conduit are coupled, such that when inserted, an external surface of the second portion is in contact with an internal surface of the end portion of the conduit;
    wherein the device is a single molded component, the first portion, the second portion, and the fastening arrangement control discharge by the conduit when the first portion is coupled to the end portion of the conduit and the end portion of the conduit is disposed between the internal surface of the first portion and the external surface of the second portion.

2. The device as claimed in claim 1, wherein the first portion is a cylinder with a first axis.

3. The device as claimed in claim 1, wherein the second portion is a conical needle with a second axis.

4. The device as claimed in claim 1, wherein the fastening arrangement comprises threads.

* * * * *